US 6,740,845 B2

(12) United States Patent
Stol et al.

(10) Patent No.: US 6,740,845 B2
(45) Date of Patent: May 25, 2004

(54) LASER WELDING WITH BEAM OSCILLATION

(75) Inventors: Israel Stol, Pittsburgh, PA (US); Richard P. Martukanitz, State College, PA (US)

(73) Assignees: Alcoa Inc., Pittsburgh, PA (US); The Penn State Research Foundation, University Park, PA (US)

( * ) Notice: Subject to any disclaimer, the term of this patent is extended or adjusted under 35 U.S.C. 154(b) by 0 days.

(21) Appl. No.: 10/155,688

(22) Filed: May 24, 2002

(65) Prior Publication Data

US 2003/0217993 A1 Nov. 27, 2003

(51) Int. Cl.$^7$ ............................................... B23K 26/00
(52) U.S. Cl. ............................. 219/121.64; 219/121.85
(58) Field of Search ....................... 219/121.64, 121.63, 219/121.78, 121.85

(56) References Cited

U.S. PATENT DOCUMENTS

| | | | |
|---|---|---|---|
| 4,369,348 A | 1/1983 | Stetson et al. .............. 219/121 |
| 4,507,540 A | 3/1985 | Hamasaki .................... 219/121 |
| 4,794,231 A | 12/1988 | Banas et al. ........... 219/121.63 |
| 4,803,334 A | * 2/1989 | Burke et al. ........... 219/121.64 |
| 4,857,697 A | * 8/1989 | Melville ................. 219/121.63 |
| 5,591,360 A | * 1/1997 | Mombo-Caristan .... 219/121.64 |
| 5,595,670 A | * 1/1997 | Mombo-Caristan .... 219/121.64 |
| 5,603,853 A | * 2/1997 | Mombo-Caristan .... 219/121.64 |
| 5,841,097 A | 11/1998 | Esaka et al. ........... 219/121.63 |
| 6,087,619 A | 7/2000 | Berkmanns et al. ... 219/121.63 |
| 6,410,882 B1 | * 6/2002 | Okada ................... 219/121.64 |

* cited by examiner

Primary Examiner—M. Alexandra Elve
(74) Attorney, Agent, or Firm—Julie W. Meder

(57) ABSTRACT

A method of welding metal components together including moving a laser beam in a first direction along an interface between a pair of metal components such that in the vicinity of the focused beam, metal from each component is vaporized to produce a keyhole in a pool of molten metal. The laser beam is oscillated in a direction different from (e.g., transverse to) the first direction such that the keyhole oscillates through the pool of molten metal and molten metal fills into the keyhole as the position of the keyhole changes.

12 Claims, 2 Drawing Sheets

LASER WELDING WITH BEAM OSCILLATION

FIELD OF THE INVENTION

The present invention relates to laser welding, more particularly, welding with an oscillating laser beam to create a moving and refilling keyhole.

BACKGROUND OF THE INVENTION

Common welded joints include butt joints, lap-penetration joints, and lap-fillet joints. Laser welding is a method of joining metal components using a focused beam of coherent light to melt adjoining components and allowing the melt to solidify into a joint. While butt joints may be produced by laser welding, they are not always suitable in the aerospace, automotive, and marine industries. Laser welding of lap-penetration joints and lap-fillet joints is more difficult to accomplish. FIGS. 1 and 2 depict the result of laser welding of a lap-penetration joint in which a laser beam is directed at the region of an interface 2 between components 4 and 6. Relative movement is effected along the interface 2 between the laser beam and the assembly of components. The laser beam may cause a portion of metal in the interface to volatilize to produce a keyhole 8 bounded by molten metal 10. The keyhole 8 advances with the movement of the laser beam in the direction of the arrow A. Molten metal 10 solidifies behind the advancing keyhole 8 to create a joint between the components.

In practice, production of lap-penetration joints and lap-fillet joints via laser welding is limited. For example, in a lap-penetration joint as shown in FIGS. 1 and 2, it is well established that the width W of the weld should be equal to or exceed the thickness t of the thinnest of the components being joined. The welding process must be controlled to minimize formation of voids in the welds that are caused by instabilities in the keyhole and/or volatilization of low melting constituents with high partial pressures (e.g., Mg). In addition, laser welding is relatively costly. The laser beam is generally operated at or above $10^6$ W/cm$^2$; efficiency dictates a need to weld at rates of at least 80 inches per minute (ipm) at this power level. When welding components up to 0.1 inch thick, it is possible to produce the required 0.1 inch weld width W at speeds exceeding 120 ipm. The formation of voids can be adequately controlled by use of defocused beams or bifocal optical systems. However, with thicker materials it is progressively more difficult to achieve the required weld width while still maintaining acceptable weld quality and speeds of travel.

When laser welding lap-fillet joints, the welding system must accommodate variations in lateral placement of the laser beam relative to the joint edge and gaps between the components to attain performance comparable to deposits made with gas metal arc welding (GMAW) at rates that justify using costlier laser welding systems.

One option for overcoming the challenges in laser welding lap-penetration and lap-fillet joints is to use beam integrators, focusing optics (mirrors or lenses) with longer focal length or defocused beams. However, to ensure reliable and consistent optical coupling between the laser and components to be joined and to achieve localized melting at the joint, the power output of the laser system must be increased to compensate for the reduction in power density. With sufficient power output, widened welds can be produced in the more placid conduction mode rather than the keyhole mode. Unlike the latter mode, which involves translation of a cavity (or keyhole) along the joining area, the conduction mode is achieved by translating a molten pool of metal along the joining area. By minimizing the violent volatilization of metal within the keyhole, the more placid conduction mode can eliminate the instabilities inherent with the keyhole mode. As a result, the conduction mode minimizes the formation of voids in the laser welds. However, to implement this approach necessitates using very powerful lasers (e.g. 18 KW to 25 KW, depending on the application) and costly laser generating systems, which makes the approach impractical for many industrial applications.

Another approach to increasing the effectiveness of laser welding is described in U.S. Pat. No. 4,369,348 by oscillating the laser beam at frequencies of over 1000 Hz. This very rapid movement of the laser is intended to distribute and time average the intensity of the laser at a frequency greater than the thermal response time of the metal. In this manner, the time averaged intensity of heat experienced by a particular location at the interface between the metal components being joined is greater than the intensity of heat experienced without oscillation. However, operation of a laser beam at oscillation frequencies of over 1000 Hz is difficult and costly. In addition, the only way to implement this approach is to weld in the conduction mode where a continuous molten pool is maintained.

Accordingly, a need remains for a low cost, effective method of laser welding.

SUMMARY OF THE INVENTION

This need is met by the method of the present invention which includes focusing a laser beam onto a joining region between a pair of metal components to form a continuous molten pool and establishing a keyhole therein. The molten pool is a mixture of metals from each of the components. By simultaneously translating the focused beam along the joining region in a first direction and oscillating the beam relative to the molten pool at a direction different from the first direction, the keyhole is continuously moved and immediately refilled by the adjoining molten metal. Welding takes place as the keyhole penetrates through the molten pool and melts the components being welded at the interface therebetween. In the vicinity of the focused laser beam, the molten pool is vaporized to produce a keyhole which is translated with the oscillating beam. As the beam oscillates in a direction different from the first direction (e.g. transverse to the first direction), the keyhole oscillates through the pool of molten metal and molten metal fills into the keyhole as the keyhole oscillates. In this manner, the keyhole continuously is produced and then is refilled with molten metal that solidifies to produce a weld.

The weld may be a lap-penetration weld, a butt weld, or a lap-fillet weld. Depending on the type of joint, thickness combination, and welding position, the laser beam oscillates at a frequency of about 5 to about 120 Hz and advances in the first direction at a rate of about 5 to about 400 ipm. When citing a range of frequency or dimension herein, the range includes all intermediate values, such as for the rate of the first direction, the rate would include 5, 6, 7, and on up through 400 ipm. The oscillations may be linear, circular, elliptical, or a combination thereof, or any other shape that accomplishes a moving keyhole. The thinner of the metal components may be over 0.1 inch thick. The present invention allows laser joining various types of joints with customized weld dimensions (e.g. 0.25 inch interfacial weld width between 0.25 inch thick components) up to about 0.50 inch wide.

DETAILED DESCRIPTION OF PREFERRED EMBODIMENTS

Figure 1:
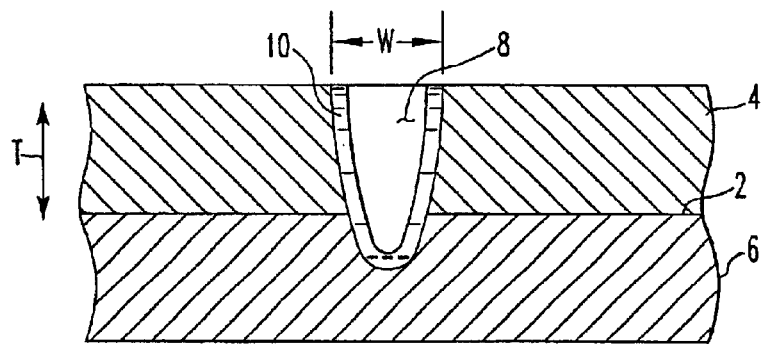
FIG. 1 is a schematic cross-sectional view of a pair of metal components laser welded to form a keyhole according to the prior art.
Figure 2:
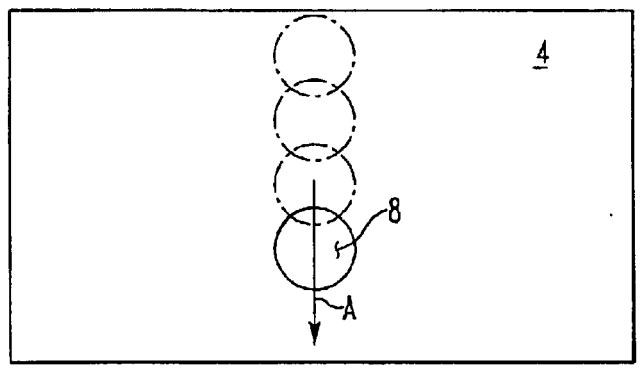
FIG. 2 is a top view of the stack of components shown in FIG. 1 operated according to the prior art.
Figure 3:
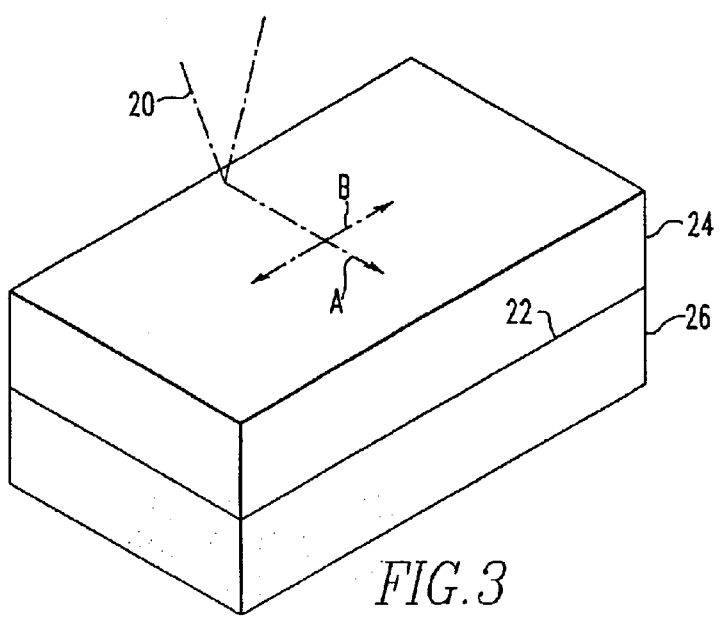
FIG. 3 is a perspective view of a pair of metal components laser welded according to the method of the present invention.

In the method of the present invention, metal components, such as steel or aluminum alloys, are laser welded together. As shown in FIG. 3, radiation 20 (such as a laser beam) is focused over an interface 22 between a pair of metal components 24 and 26. The metal components 24 and 26 of FIG. 3 are stacked upon one another to form a lap-penetration weld. This is not meant to be limiting; other weld joints may be produced according to the method of the present invention, such as butt welds and lap-fillet welds. The laser beam 20 travels in the direction of arrow A which may follow a linear path or a path of another configuration. The path of arrow A determines the location of the joint between the components 24 and 26.

Figure 4:
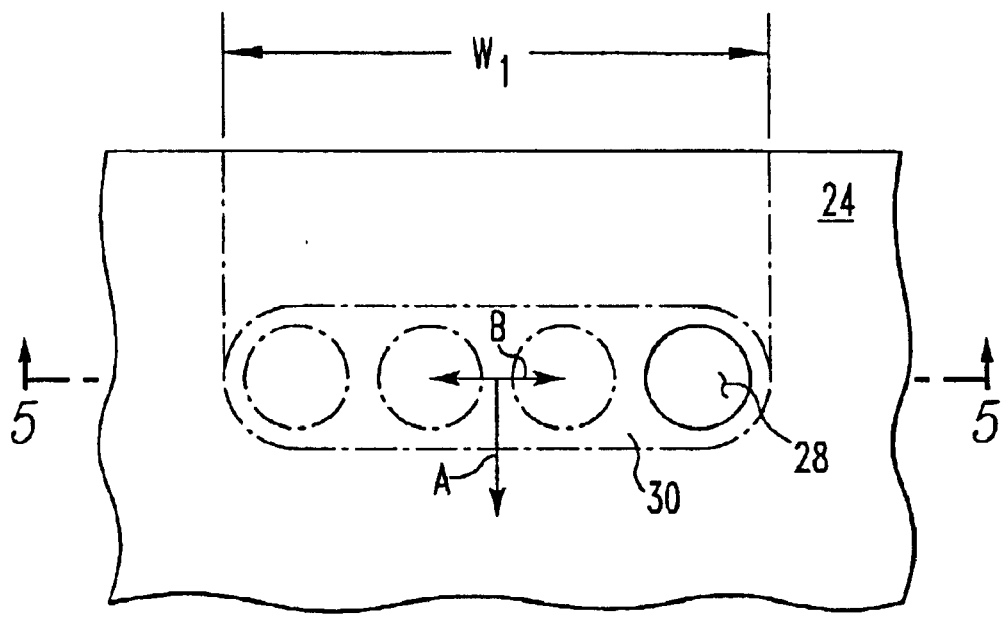
FIG. 4 is a top view of the stack of components shown in FIG. 3.
Figure 5:
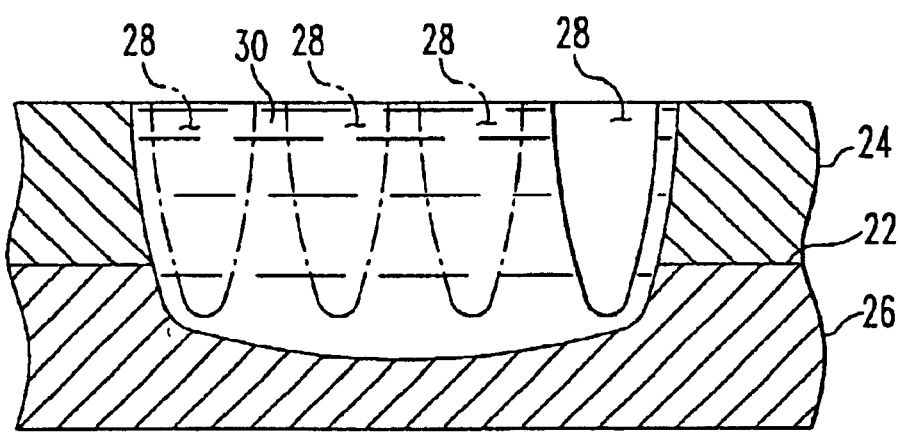
FIG. 5 is a schematic cross-sectional view of the metal components shown in FIG. 4 taken along lines 4—4.

While the laser beam 20 travels in the direction of arrow A, the laser beam 20 also is oscillated in the direction of double arrow B. Double arrow B is at angle to arrow A such as transverse to the direction of arrow A. In FIG. 3, the laser beam 20 is shown as oscillating in a linear path perpendicular to arrow A, but this is not meant to be limiting. The laser beam 20 may travel in other paths, such as circular, elliptical, sinusoidal, or the like. In the vicinity of the focused laser beam 20, as shown in FIGS. 4 and 5, the metal of the components 24 and 26 vaporizes to produce a keyhole 28 surrounded by molten metal 30. Oscillation of the laser beam 20 causes the keyhole 28 to fill in with molten metal 30 and reform as a new keyhole 28 adjacent thereto. As the keyhole 28 continuously moves from one position to another position across the path of the arrow A and vacates its previous position in the pool of molten metal 30, the vacated keyhole 28 fills in and reforms as a new keyhole 28. This process has the appearance of movement of the keyhole transversely through the molten metal 30 with the molten metal 30 acting to continuously "heal" the vacated keyhole 28. In this manner, a weld having a width $W_1$ is produced that is significantly wider than the welds of the prior art. For example, when welding lap-penetration joints, the implementation of the invention affords joining with welds having an interfacial width equal to or wider than the thickness of the thinner part being welded. Welds produced using this method are typically two to five times the width of laser beam welds produced using conventional methods. Wider welds are particularly helpful in producing lap-penetration welds in thicker components, i.e., components thicker than 0.1 inch and up to about 0.25 inch thick.

Suitable frequencies of oscillation of the laser beam 20 are about 5 to about 120 Hz and may be about 10 Hz. The laser beam may advance along the interface at a rate of about 5 to about 400 ipm, or about 40 to about 200 ipm, or about 80 ipm.

In certain instances, it may be helpful to include a source of filler material, such as a filler wire. Filler material may be added during welding and may be in the form of a wire, having a diameter of about between 0.030 and 0.062 inch, or a powder. The filler material may be an alloy selected based on the desired attributes of the weld using established engineering principles. The filler material may be added to the front or rear of the molten pool, typically, at an angle of between 30 and 60 degrees off of horizontal, i.e., the plane of the upper component. Processing gas may also be utilized to shield the molten pool and to redirect the vaporized metal away from the beam and material interaction zone, which is commonly referred to as plasma suppression. The gas typically is provided at the front of the weld pool through a nozzle directed to the rear of the pool at an angle of between 30 and 60 degrees off of the horizontal.

EXAMPLE

A lap-penetration laser weld was produced between a pair of 0.196 inch thick Alclad alloy 6013-T6 plates with 0.045 inch diameter alloy 4047 filler wire at 35° feed angle, 90 ipm wire feed rate using 10 KW power $CO_2$ laser (110 cfh flow rate of helium as plasma suppressing gas applied from the moving front) traveling at 80 ipm focused 0.25 inch below the top surface of the plate stack up. The laser was linearly oscillated in a direction transverse to the welding direction at 400 ipm, 0.25 inch total oscillation width (i.e., 0.125 inch center to center). The resultant interfacial weld width was slightly greater than 0.22 inch.

Having described the presently preferred embodiments, it is to be understood that the invention may be otherwise embodied within the scope of the appended claims.

We claim:

1. A method of welding metal components together comprising the steps of:

moving a round laser beam spot in a first direction along an interface between a pair of metal components such that in the vicinity of the laser beam, metal from each component melts and vaporizes to produce a keyhole in a pool of molten metal; and oscillating the laser beam spot in a direction different from the first direction such that the keyhole oscillates through the pool of molten metal and molten metal fills into the keyhole as the position of the keyhole changes.

2. The method of claim 1, wherein the laser beam spot oscillates in a direction transverse to the first direction.

3. The method of claim 1, wherein the weld is a lap-penetration weld.

4. The method of claim 1, wherein the weld is a butt weld.

5. The method of claim 1, wherein the weld is a lap-fillet weld.

6. The method of claim 1, wherein the metal components each comprise an aluminum alloy.

7. The method of claim 1, wherein the laser beam spot oscillates at a frequency of about 5 to about 120 Hz.

8. The method of claim 7, wherein the laser beam spot advances along the interface at a rate of about 5 to about 400 inches per minute.

9. The method of claim 7, wherein the weld is over about 0.1 to about 0.25 inch wide.

10. The method of claim 1, wherein the laser beam spot oscillates in a linear path.

11. The method of claim 1, wherein the laser beam spot oscillates in a circular path, an elliptical path, or both.

12. The method of claim 3, wherein a one of the metal components is thinner than the other metal component, said thinner metal component being over about 0.1 inch thick.

* * * * *

UNITED STATES PATENT AND TRADEMARK OFFICE
CERTIFICATE OF CORRECTION

PATENT NO. : 6,740,845 B2  Page 1 of 1
DATED : May 25, 2004
INVENTOR(S) : Stol et al.

It is certified that error appears in the above-identified patent and that said Letters Patent is hereby corrected as shown below:

<u>Column 4,</u>
Line 63, "wherein a one of" should read -- wherein one of --

Signed and Sealed this

Eighth Day of February, 2005

JON W. DUDAS
*Director of the United States Patent and Trademark Office*